US008199163B2

(12) United States Patent
Choi et al.

(10) Patent No.: US 8,199,163 B2
(45) Date of Patent: Jun. 12, 2012

(54) SIGNAL PROCESSING DEVICE, METHOD OF CORRECTION DATA USING THE SAME, AND DISPLAY APPARATUS HAVING THE SAME

(75) Inventors: Yong-Jun Choi, Cheonan-si (KR); Jae-Won Jeong, Seoul (KR); Bong-Im Park, Cheonan-si (KR); Bong-Ju Jun, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 720 days.

(21) Appl. No.: 12/205,575

(22) Filed: Sep. 5, 2008

(65) Prior Publication Data

US 2009/0153592 A1 Jun. 18, 2009

(30) Foreign Application Priority Data

Dec. 13, 2007 (KR) ........................ 10-2007-130 198

(51) Int. Cl.
*G09G 5/02* (2006.01)
*G09G 5/10* (2006.01)
*H04N 1/40* (2006.01)

(52) U.S. Cl. ....... 345/600; 358/3.23; 358/3.01; 345/690

(58) Field of Classification Search ................ 358/3.23, 358/3.01

See application file for complete search history.

(56) References Cited

U.S. PATENT DOCUMENTS

2005/0111046 A1* 5/2005 Kurumisawa et al. ....... 358/3.06
2005/0264836 A1* 12/2005 Gotoh et al. .................. 358/1.9
2006/0087696 A1 4/2006 Lee
2007/0171113 A1 7/2007 Lan

FOREIGN PATENT DOCUMENTS

JP 2006-133765 5/2006
JP 2007-195018 8/2007
KR 1020040049727 A 6/2004
KR 1020060035344 A 4/2006
KR 1020070077047 A 7/2007

* cited by examiner

*Primary Examiner* — Xiao M. Wu
*Assistant Examiner* — Matthew D Salvucci
(74) *Attorney, Agent, or Firm* — Innovation Counsel LLP

(57) ABSTRACT

A signal processing device includes a memory in which a color correction data is stored. The memory stores a first color correction data having the same number of bits as an input image data and a second color correction data having fewer number of bits than the input image data. The number of color correction data corresponding to a low gray-scale range increases and the number of color correction data corresponding to a high gray-scale range decreases by the same amount that the number of the color correction data corresponding to the low gray-scale range increased. Thus, a color characteristic corresponding to the low gray-scale range may be improved without changing the total number of color correction data.

17 Claims, 7 Drawing Sheets

SIGNAL PROCESSING DEVICE, METHOD OF CORRECTION DATA USING THE SAME, AND DISPLAY APPARATUS HAVING THE SAME

CROSS-REFERENCE TO RELATED APPLICATION

This application relies for priority upon Korean Patent Application No. 2007-130198 filed on Dec. 13, 2007, the contents of which are herein incorporated by reference in its entirety.

BACKGROUND OF THE INVENTION

1. Field of the Invention

The present invention relates to a signal processing device, a method of correcting data using the same, and a display apparatus having the same. More particularly, the present invention relates to a signal processing device capable of correcting a color characteristic of an image signal, a method of correcting data using the signal processing device, and a display apparatus having the signal processing device.

2. Description of the Related Art

In general, a liquid crystal display is a type of flat panel display that displays images using liquid crystals.

A liquid crystal display includes a liquid crystal display panel that displays images and a timing controller that drives the liquid crystal display panel. The timing controller receives image signals including red, green, and blue color signals and controls timings for applying the image signals to the liquid crystal display panel. The timing controller performs a control operation (i.e., adaptive color correction) in order to improve a color characteristic (i.e., gamma characteristic). For the color correction, the timing controller reads out correction data stored in a memory and corrects the color characteristic of the image signals based on the read-out correction data.

In case of a timing controller that processes an 8-bit image signal, 8-bit color correction data are stored in the memory. That is, 256 color compensation data corresponding to 0th gray-scale, which is the lowest gray-scale, to 255th gray-scale, which is the highest gray-scale, are stored in the memory. If 10-bit image signal is input to the timing controller, a 10-bit color correction data need to be stored in the memory, but the color correction data corresponding to the 10-bit image signal are stored in the memory as 8-bit data type in order to reduce a size of the memory. When 10-bit color correction data are stored in the memory, 1024 color correction data corresponding to 0 gray-scale to 1023 gray-scale are stored. However, when the 10-bit color correction data are stored in the memory as 8-bit data type, 10-bit color correction data corresponding to every fourth gray-scale are stored in the memory. Accordingly, 256 color correction data corresponding to 0 gray-scale, 4 gray-scale, 8 gray-scale, . . . , 1020 gray-scale are stored in the memory, so that no additional cost is required for the memory.

However, when the color correction data corresponding to 10-bit image signal are stored in the memory as 8-bit data type, the amount of the color correction data is insufficient to correct the color characteristic of 10-bit image signal, especially in the low gray-scale range.

SUMMARY OF THE INVENTION

The present invention provides a signal processing device capable of improving a color characteristic of an image signal without changing of color correction data.

The present invention also provides a method of correcting data using the signal processing device.

The present invention also provides a display apparatus having the signal processing device.

In one aspect of the present invention, a signal processing device includes a memory, a bit expander, and a color corrector. The memory stores a first color correction data having the same number of bits as an input image data and a second color correction data having fewer number of bits than the input image data. The bit expander receives the second color correction data and expands the second color correction data to a third color correction data having a number of bits equal to the number of bits of the input image data using a linear interpolation. The color corrector receives the input image data, corrects the input image data corresponding to a first gray-scale range with reference to the first color correction data, and corrects the input image data corresponding to a second gray-scale range with reference to the third color correction data to generate an output image data. The second gray-scale range is higher than the first gray-scale range.

In another aspect of the present invention, a method of correcting data is provided. A first color correction data having the same number of bits as an input image data and a second color correction data having fewer number of bits than the input image data are stored. The second color correction data is expanded to a third color correction data having a number of bits equal to the number of bits of the input image data using linear interpolation. The input image data corresponding to a first gray-scale range is corrected with reference to the first color correction data, and the input image data corresponding to a second gray-scale range is corrected with reference to the third color correction data to generate an output image data. The second gray-scale range is higher than the first gray scale range.

In yet another aspect of the present invention, a display apparatus includes a signal processor that corrects a color characteristic of an input image data with reference to a first color correction data and a third color correction data and outputs the corrected input image data as an output image data, and a display panel that displays an image in response to the output image data.

The signal processor includes a memory, a bit expander, and a color corrector. The memory stores the first color correction data having the same number of bits as the input image data and a second color correction data having fewer number of bits than the input image data. The bit expander receives the second color correction data and expands the second color correction data to the third color correction data having the same number of bits as the input image data using linear interpolation. The color corrector receives the input image data, corrects the input image data corresponding to a first gray-scale range with reference to the first color correction data, and corrects the input image data corresponding to a second gray-scale range with reference to the third color correction data to generate the output image data. The second gray-scale range is higher than the first gray-scale range.

According to the above, the number of color correction data in the first gray-scale range increases, and the number of color correction data in the second gray-scale range decreases by the increase of the number of color correction data in the first gray-scale range. Thus, the color characteristic of the first gray-scale range may be improved without variation of the number of color correction data.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
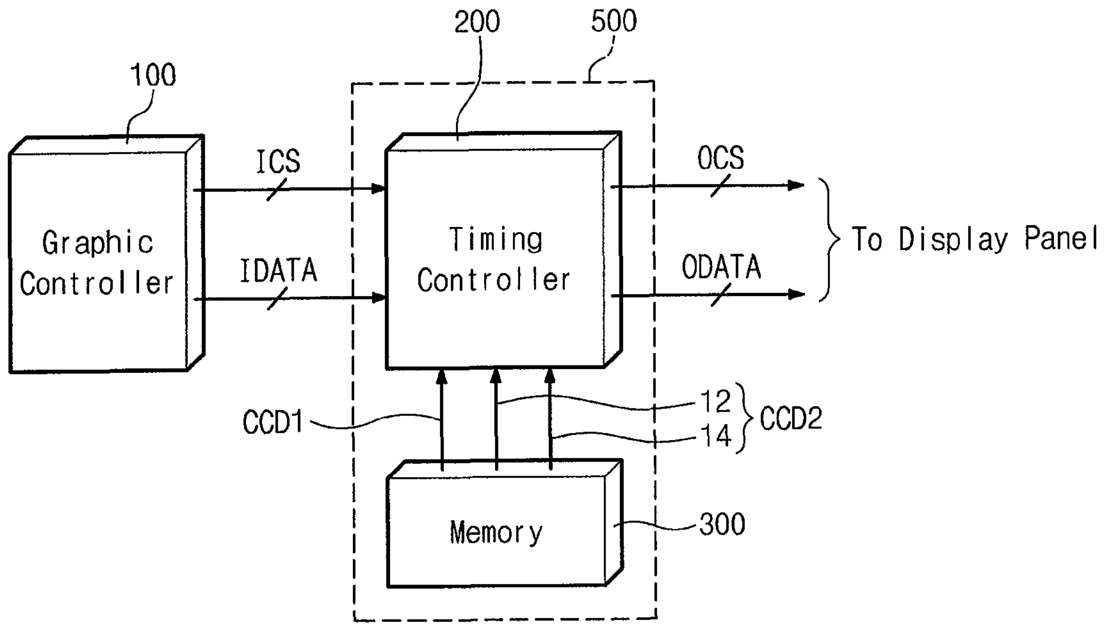
FIG. 1 is a block diagram showing an exemplary embodiment of a signal processing device according to the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a block diagram showing an exemplary embodiment of a signal processing device according to the present invention. For the convenience of description, an external device (i.e., graphic controller) that applies an input image data and an input control signal to the signal processing device is further shown in FIG. 1.

Referring to FIG. 1, a signal processing device 500 includes a timing controller 200 and a memory 300 in order to drive a display panel (not shown in FIG. 1). The timing controller 200 receives an input image data IDATA including red, green, and blue from an external device 100 (hereinafter, referred to as a graphic controller) and outputs an output image data ODATA and an output control signal OCS in response to an input control signal ICS that controls an output timing of the input image data IDATA. In order to correct a color characteristic (i.e., a gamma characteristic) of the input image data IDATA, the timing controller 200 corrects the input image data IDATA based on a predetermined color correction data. The corrected input image data IDATA is converted into the output image data ODATA through a dithering process. The memory 300 is installed outside the timing controller 200 and stores the predetermined color correction data therein. In the present exemplary embodiment, the memory 300 that is installed outside the timing controller 200 has been shown in FIG. 1, but the memory 300 may be installed inside the timing controller 200 in other embodiments. The memory 300 may be RAM (random access memory), ROM (read only memory), or EEPROM (electrically erasable and programmable read only memory). In case that the memory 300 is EEPROM, the timing controller 200 reads out all color correction data from the EEPROM 300 and corrects the gamma characteristic of the input image data IDATA received from the graphic controller 100 based on the read-out color correction data while the signal processing device 500 executes the processing operation.

The color correction data includes a first color correction data CCD1 having a same bit number the same as that of the input image data IDATA and a second color correction data CCD2 having a bit number smaller than that of the input image data IDATA. Hereinafter, the bit number of the input image data IDATA is defined as N (N is a natural number) bits.

The first color correction data CCD1 includes N (N is a natural number) bits and corresponds to a first gray-scale range of the input image data IDATA. The second color correction data CCD2 corresponds to a second gray-scale range of the input image data IDATA, which has a gray-scale level higher than that of the first gray-scale range. The first gray-scale range corresponds to a range from the lowest gray-scale level to a predetermined N-th gray-scale level, and the second gray-scale range corresponds to a range from (N+1)-th gray-scale level to the highest gray-scale level. That is, the first gray-scale range corresponds to the low gray-scale range having a relatively low gray-scale level, and the second gray-scale range corresponds to the high gray-scale range having a relatively high gray-scale level. Also, the second gray-scale range may be divided into an intermediate gray-scale range and a high gray-scale range having a gray-scale level higher than that of the intermediate gray-scale range. The intermediate gray-scale range corresponds to a range from the (N+1)-th gray-scale level to a predetermined (N+K)-th (K is a natural number greater than 1) gray-scale level, and the high gray-scale range corresponds to a range from (N+K+1)-th gray-scale level to the highest gray-scale level.

The second color correction data CCD2 includes a color correction data having M bits (M is a natural number smaller than N, hereinafter, referred to as M-bit color correction data) and a color correction data having L (hereinafter, referred to as L-bit color correction data). The M-bit color correction data 12 serves as the color correction data for the input image data IDATA corresponding to the intermediate gray-scale range, and the L-bit color correction data 14 serves as the color correction data for the input image data IDATA corresponding to the high gray-scale range.

Figure 2:
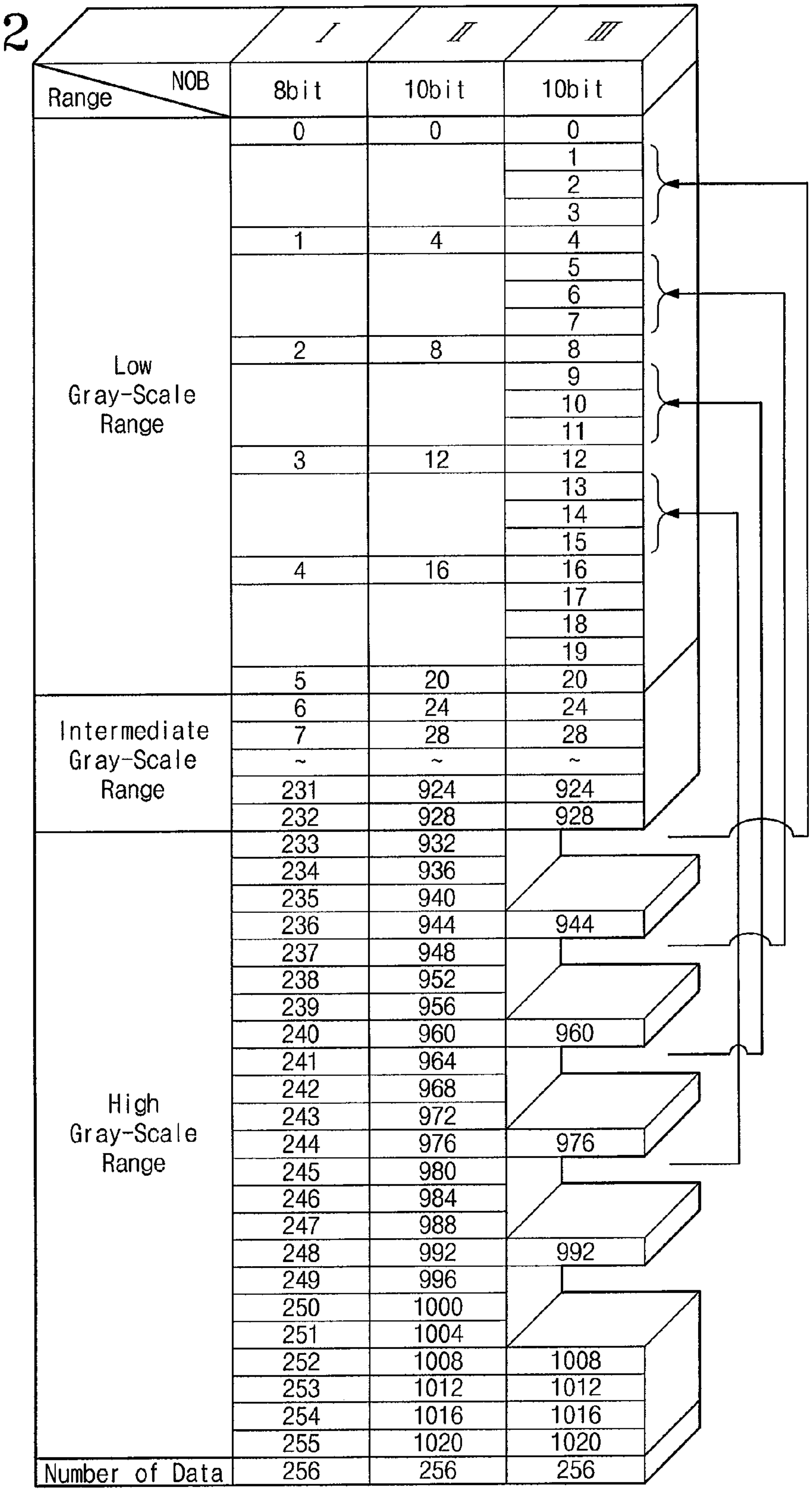
FIG. 2 is a schematic diagram showing color correction data stored in a memory of FIG. 1.

FIG. 2 is a schematic diagram showing an exemplary embodiment (III) of a color correction data stored in a memory of FIG. 1. In FIG. 2, an example (I) represents conventional 8-bit color correction data stored in a memory according to a conventional data storing format, and an example (II) represents conventional 10-bit color correction data stored in a memory according to a conventional data storing format. Further, in FIG. 2, the memory has a size in which the color correction data corresponding to 256 gray-scales are stored.

Referring to FIG. 2, according to the conventional data storing formats (I) and (II), in case that the 8-bit color correction data are stored in the memory 300 as gray-scales (I), the 8-bit color correction data may represent 256 gray-scales, so that all 256 color correction data may be stored in the memory 300 without relating to the gray-scale range of the low gray-scale range, the intermediate gray-scale range, and the high gray-scale range. In case that 10-bit color correction data are stored in the memory 300 as gray-scales (II), the 10-bit color correction data may represent 1024 gray-scales. However, since the memory 300 may store only 256 color correction data corresponding to 256 gray-scales therein, a first color correction data corresponding to a first gray-scale (i.e., 0 gray-scale level) and every fourth color correction data from a second gray-scale (i.e., 1 gray-scale level) are stored in the memory 300. That is, three color correction data corresponding to three gray-scale levels between two gray-scale levels are not stored in the memory 300 when the color correction data corresponding to 256 gray-scales are represented by 10 bits. Thus, as shown in FIG. 2, the number of the color correction data represented by 8 bits and stored in the memory 300 and the number of the color correction data represented by 10 bits and stored in the memory 300 are the same. As a result, 256 gray-scale data represented by 10 bits and stored in the memory 300 (II) are may be inadequate as color correction data. Particularly, in the low gray-scale range, the color correction data stored by the above-mentioned conventional method (II) would be less effective as the gray-scale data than those stored in the intermediate gray-scale range and the high gray-scale range.

For prevention of the above-mentioned problems of the conventional data storing formats (I) and (II), according to the exemplary embodiment of the present data storing formats (III), the low gray-scale range is more finely divided into a predetermined number of levels than the low gray-scale range of the conventional data storing formats (I) and (II), so that more gray-scale data may be added to the low gray-scale range as the color correction data in comparison with those of the low gray-scale range of the conventional data storing formats (I) and (II). The intermediate gray-scale range of the present data storing formats (III) is divided into the same number of levels as that of the low gray-scale range of the conventional data storing formats (I) and (II). In the high gray-scale range of the present data storing formats (III), the number of the color correction data is reduced by the number of the color correction data that are added to and stored in the low gray-scale range. That is, the low gray-scale range, the intermediate gray-scale range, and the high gray-scale range have different gray-scale intervals. Particularly, the first color correction data CCD1 has gray-scale levels that are more closely spaced than those of the second color correction data CCD2. As described above, the number of the first color correction data CCD1 stored in the low gray-scale range of the memory 300 increases remarkably compared with the number of the color correction data stored in the low gray-scale range according to the conventional data storing format (I) or (II), thereby controlling the color characteristic of the input image data IDATA.

Also, since the number of the first color correction data CCD1 stored in the low gray-scale range increases by the reduced number of the color correction data stored in the low gray-scale range according to the conventional data storing format (I) or (II), a total number of the color correction data stored in the memory 300 according to the present data storing format (III) is same as the number of the color correction data stored in the memory 300 according to the conventional data storing format (I) or (II). Thus, the signal processing device 500 may correct the color characteristic of the input image data IDATA without requiring memory replacement or upgrade, thereby reducing a product cost.

Hereinafter, the timing controller 200 that corrects the input image data IDATA with reference to the first and second color correction data CCD1 and CCD2 stored in the memory 300 will be described in detail.

Figure 3:
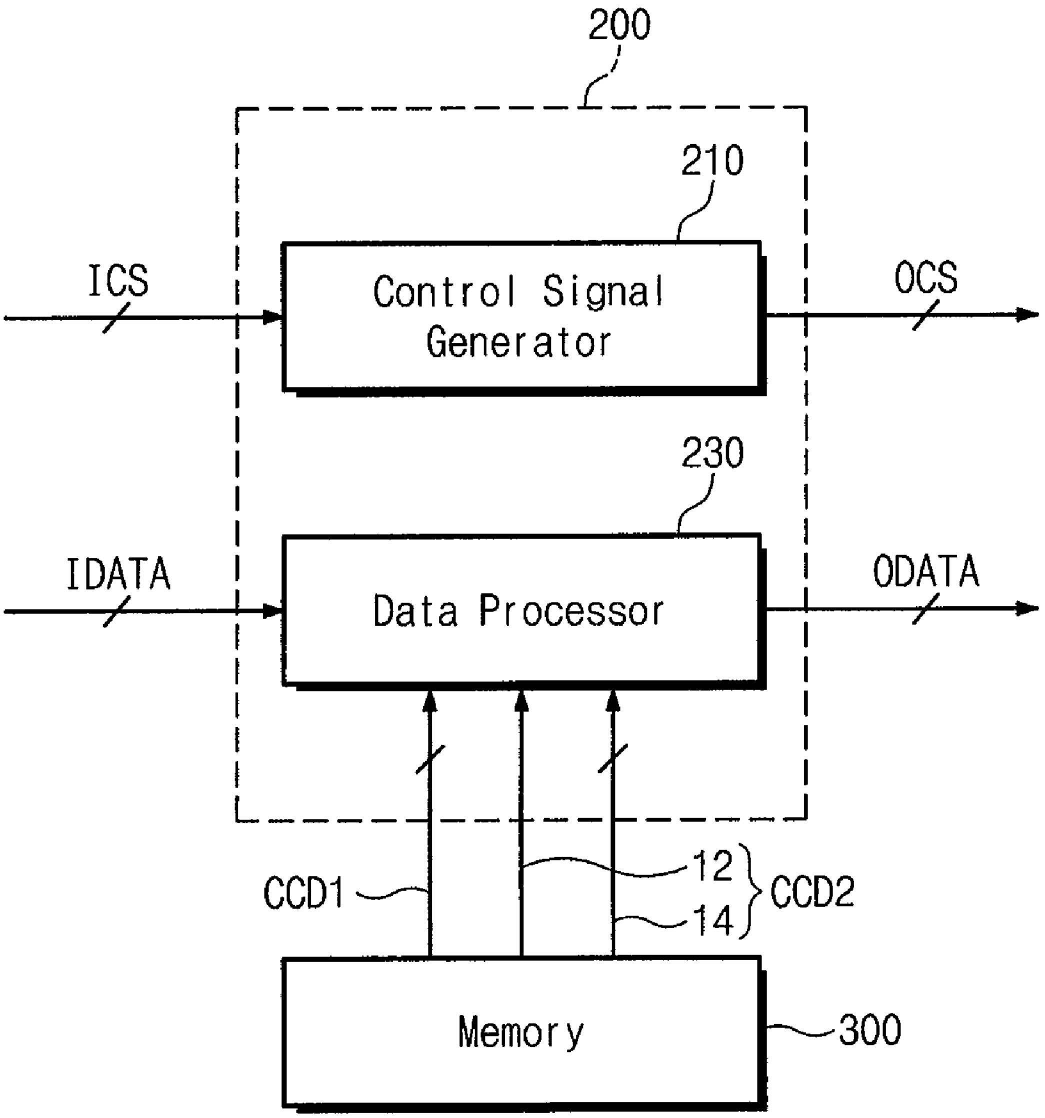
FIG. 3 is a block diagram showing an inner configuration of a timing controller of FIG. 1.
Figure 4:
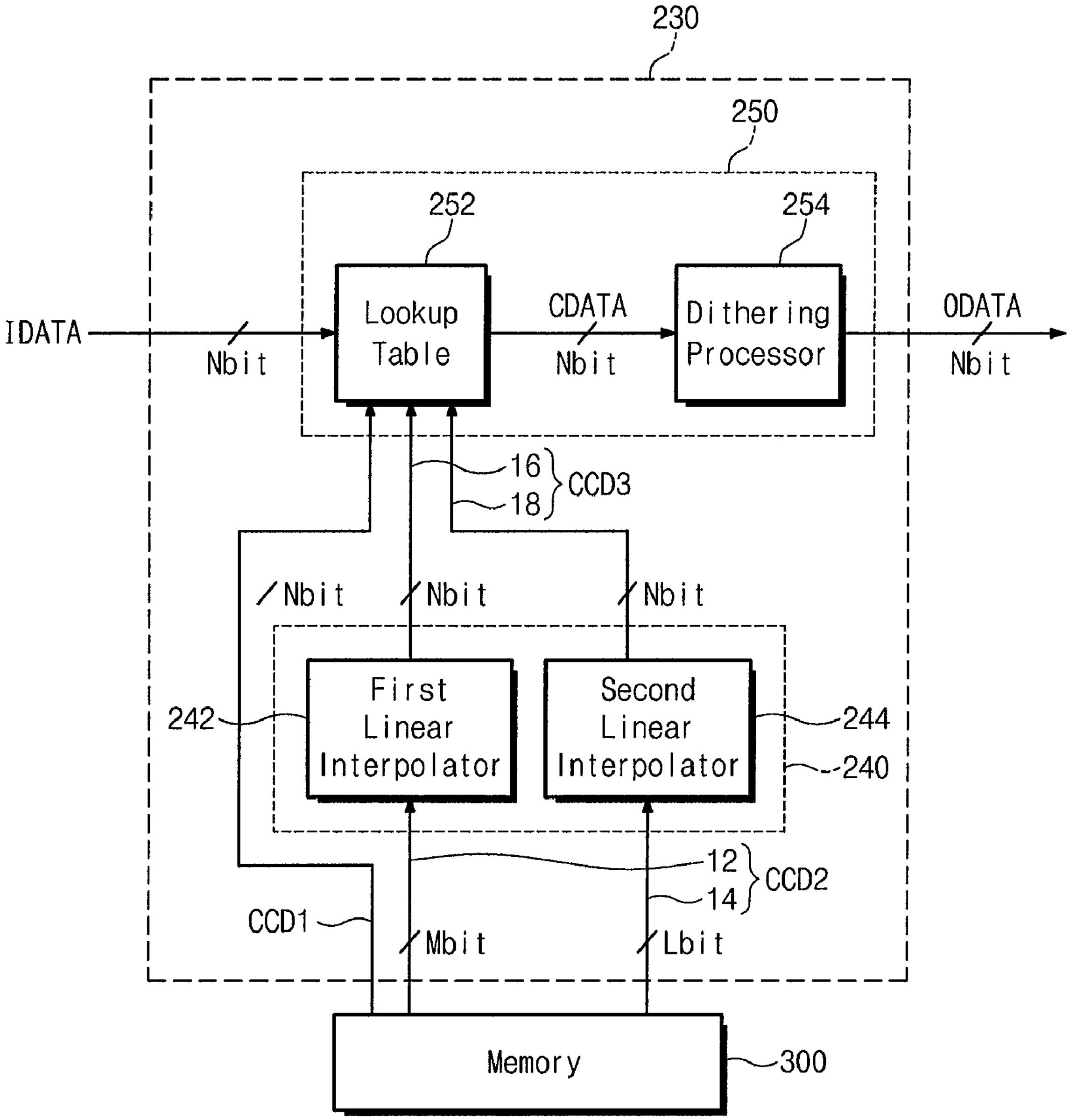
FIG. 4 is a block diagram showing an inner configuration of a data processor of FIG. 1.

FIG. 3 is a block diagram showing an inner configuration of a timing controller of FIG. 1, and FIG. 4 is a block diagram showing an inner configuration of a data processor of FIG. 1.

Referring to FIG. 3, the timing controller 200 includes a control signal generator 210 and a data processor 230. The control signal generator 210 receives an input control signal ICS that is used to control an input timing of the input image data IDATA from the graphic controller 100 and converts the input control signal ICS into an output control signal OCS that is used to control an output timing of the output image data ODATA in order to output the output control signal OCS. The data processor 230 reads out the first and second color correction data CCD1 and CCD2 stored in the memory 300 and converts the input image data IDATA from the graphic controller 100 into the output image data ODATA with reference to the first and second color correction data CCD1 and CCD2 read out from the memory 300.

Referring to FIG. 4, the data processor 230 includes a bit expander 240 and a color corrector 250.

The bit expander 240 receives the second color correction data CCD2, expands the number of bits of the second color correction data CCD2 to have the number of bits (N-bit) of the input image data IDATA using a linear interpolation, and outputs the second color correction data CCD2 as a third color correction data CCD3 having the same bit number as that of the input image data IDATA. As the above-described, the second color correction data CCD2 includes the M-bit color correction data 12 and the L-bit color correction data 14. The third color correction data CCD3 includes a first subset 16 of the third color correction data CCD3 and a second subset 18 of the third color correction data CCD3.

The bit expander 240 includes a first linear interpolator 242 and a second linear interpolator 244.

The first linear interpolator 242 receives the M-bit color correction data 12 from the memory 300 and expands the M-bit color correction data 12 by (N−M)-bit using the linear interpolation to generate the first subset 16 of the third color correction data CCD3. Accordingly, the number of bits of the first subset 16 is expanded to N-bit.

The second linear interpolator 244 receives the L-bit color correction data 14 from the memory 300 and expands the L-bit color correction data 14 by (N−L)-bit using the linear interpolation to generate the second subset 18 of the third color correction data CCD3. Accordingly, the number of bits of the second subset 18 of the third color correction data CCD3 is expanded to N-bit. Assuming that N, M, and L are 10, 8, and 6, respectively, the first linear interpolator 242 expands the M-bit color correction data 12 by 2 bits to interpolate the first subset 16 of the third color correction data CCD3 of 10 bits and the second linear interpolator 244 expands the L-bit color correction data 14 by 4 bits to interpolate the second subset 18 of the third color correction data CCD3. The interpolated subsets 16, 18 of the third color correction data CCD3 are output to the color corrector 250.

The color corrector 250 includes a lookup table 252 and a dithering processor 254. The lookup table 252 stores the first and second subsets 16, 18 of third color correction data CCD3 applied from and linearly interpolated by the bit expander 240 and the first color correction data CCD1 output from the memory 300. That is, the first and second subsets 16, 18 of third color correction data CCD3 that are linearly interpolated are stored in the lookup table 252 together with the first color correction data CCD1 that are not linearly interpolated. Consequently, the number of the first color correction data CCD1 in the low gray-scale range increases by the number of the L-bit color correction data 14. The lookup table 252 converts the N-bit input image data IDATA corresponding to the low gray-scale into N-bit input image data CDATA that are color-corrected with reference to the first color correction data CCD1, converts the N-bit input image data IDATA corresponding to the intermediate gray-scale range into N-bit input image data CDATA that are color-corrected with reference to the first subset 16 of the third color correction data CCD3, and converts the N-bit input image data IDATA corresponding to the high gray-scale range into N-bit input image data CDATA that are color-corrected with reference to the second subset 18 of the third color correction data CCD3. The color-corrected N-bit input image data CDATA are output to the dithering processor 254.

The dithering processor 254 dithers the color-corrected N-bit input image data CDATA to generate the output image data ODATA. The dithering processor 254 rearranges the input image data in order to display an image corresponding to the N-bit input image data. The image is displayed on a display panel module by using only the number of bits (i.e., K-bit) that is processed by the display panel module among the N-bit input image data. In other words, the dithering processor 254 calculates an average gray-scale of pixels that are timely and spatially adjacent to (N−K)-bit (i.e., lower bits of the input image data) to display the image corresponding to the N-bit input image data.

Figure 5:
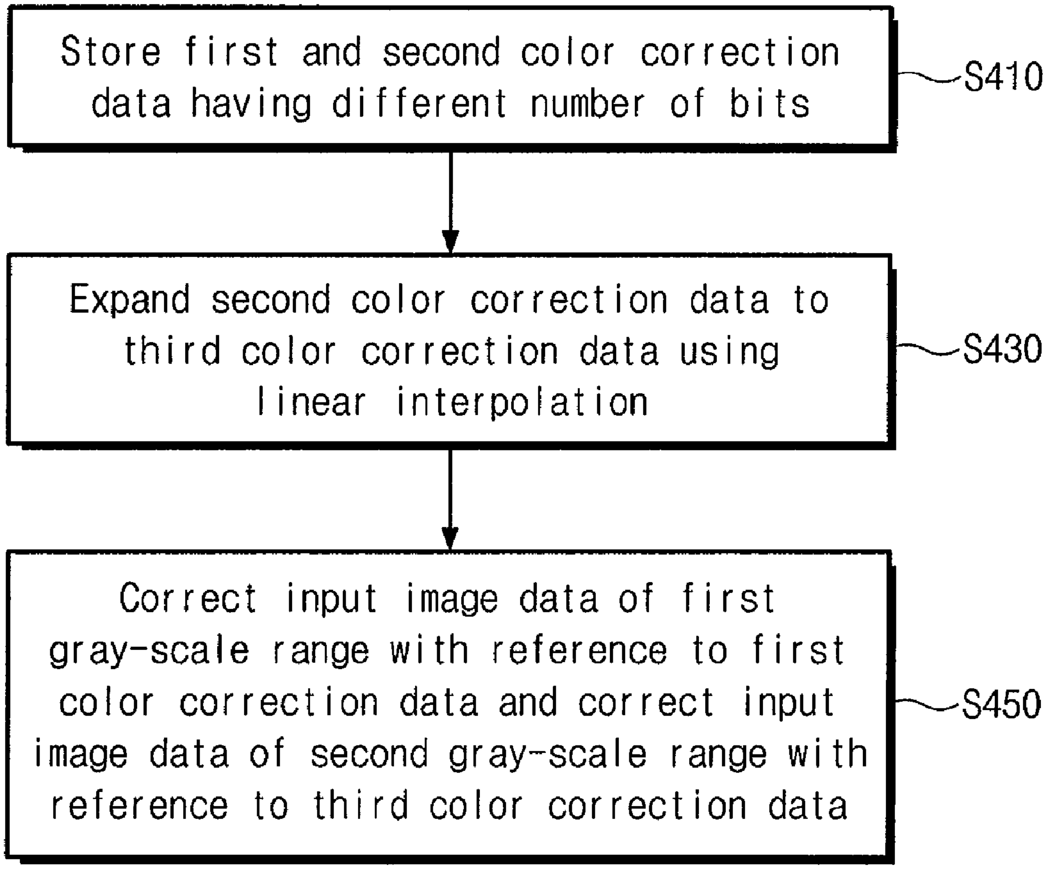
FIG. 5 is a flowchart diagram illustrating a method of correcting data using the signal processing device shown in FIGS. 1 to 3.

FIG. 5 is a flowchart diagram illustrating a method of correcting data using the signal processing device shown in FIGS. 1 to 3.

Referring to FIG. 5, the first color correction data CCD1 and the second color correction data CCD2 having different number of bits from that of the first color correction data CCD1 are stored (S410). Particularly, the first color correction data CCD1 has a number of bits equal to that of the input image data IDATA and is used to correct the input image data corresponding to a first gray-scale range. The second color correction data CCD2 has fewer number of bits than the first color correction data CCD1 and is used to correct the input image data corresponding to a second gray-scale range having a gray-scale level higher than that of the first gray-scale range. In the present exemplary embodiment, the first gray-scale range corresponds to the low gray-scale range and the second gray-scale range corresponds to the intermediate gray-scale range and the high gray-scale range.

Since the number of bits of the first color correction data CCD1 is greater than the number of bits of the second color correction data CCD2, the number of the first color correction data CCD1 is greater than the number of the second color correction data CCD2. When assuming that the number of bits of the input image data IDATA is N (N is a natural number), the second color correction data CCD2 includes the M-bit color correction data 12 (M is a natural number smaller than N) and the L-bit color correction data 14 (L is a natural number smaller than M). Thus, the number of the M-bit color correction data 12 is greater than that of the L-bit color correction data 14. The M-bit color correction data 12 serves as the color correction data of the input image data IDATA corresponding to the intermediate gray-scale range, and the L-bit color correction data 14 serves as the color correction data of the input image data IDATA corresponding to the high gray-scale range.

Then, the second color correction data CCD2 is expanded to the third color correction data CCD3 using linear interpolation (S430). That is, the second color correction data CCD2 is expanded to the third color correction data CCD3 having the number of bits equal to the number of bits of the first color correction data CCD1. In this case, the third color correction data CCD3 includes the first subset 16 of the third color correction data CCD3 and the second subset 18 of the third color correction data CCD3. The first subset 16 of the third color correction data CCD3 is obtained by expanding the M-bit color correction data, and the second subset 18 of the third color correction data CCD3 is obtained by expanding the L-bit color correction data. Accordingly, each of the first and second subsets 16, 18 of the third color correction data CCD3 has the number of bits of N. Consequently, the first color correction data CCD1 used to correct the input image data corresponding to the low gray-scale range is not interpolated.

Next, the input image data IDATA corresponding to the first gray-scale range is corrected with reference to the first color correction data CCD1, and the input image data IDATA corresponding to the second gray-scale range is corrected with reference to the first and second subsets 16, 18 of the third color correction data CCD3 (S450).

As described above, the signal processing device 500 expands the number of bits of the color correction data corresponding to the low gray-scale range to increase the number of color correction data CCD1 and contracts the number of bits of the color correction data corresponding to the high gray-scale range to decrease the number of color correction data. Thus, although 8-bit color correction data is expanded to 10-bit color correction data, the total number of color correction data of the 10-bit color correction data is not increased from the number of 8-bit color correction data. Thus, this method increases the number of bits of the color correction data without requiring more memory space.

Further, in case that the number of bits of the color correction data stored in the memory 300 expands to 10-bit from 8-bit, the number of the 10-bit color correction data of the low gray-scale range increases by four times compared with the number of the 8-bit color correction data of the low gray-scale range. Thus, the number of the color correction data of the low gray-scale range increases, to thereby improve the color characteristic (i.e., gamma characteristic) of the low gray-scale.

Figure 6:
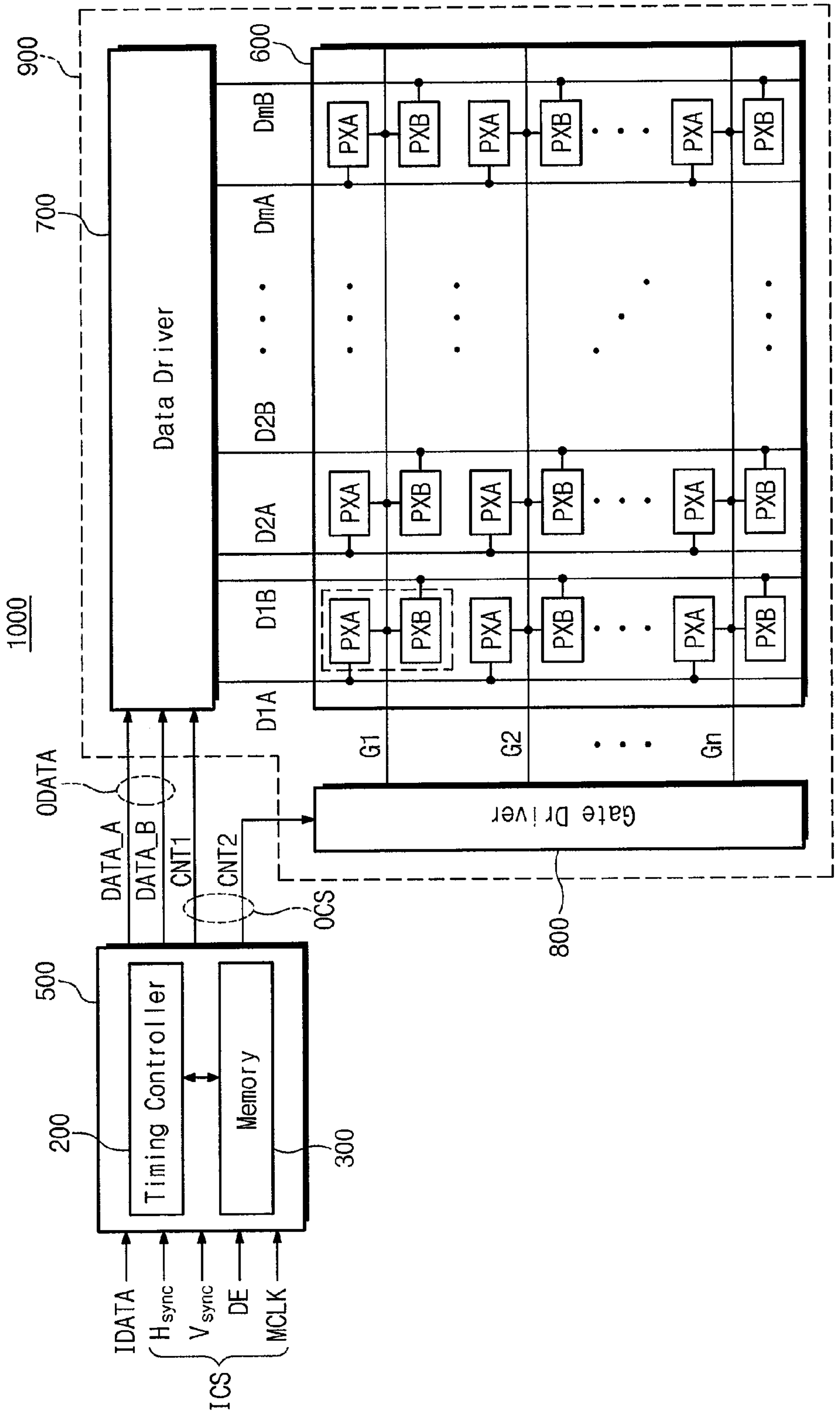
FIG. 6 is a block diagram showing an exemplary embodiment of a display apparatus having the signal processing device of FIG. 1.
Figure 7:
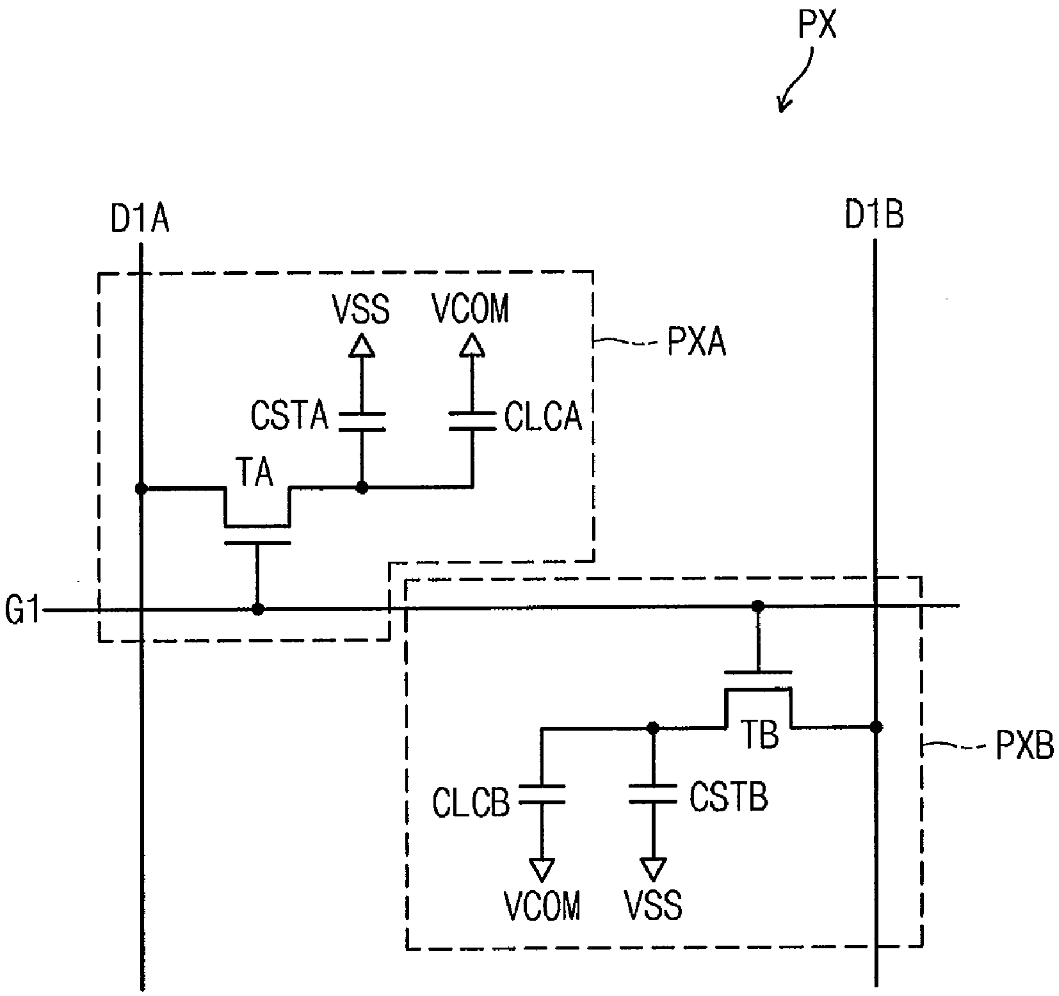
FIG. 7 is an equivalent circuit diagram showing a pixel of the display apparatus of FIG. 6.

FIG. 6 is a block diagram showing an exemplary embodiment of a display apparatus having the signal processing device of FIG. 1, and FIG. 7 is an equivalent circuit diagram showing a pixel of the display apparatus of FIG. 6. In FIG. 6, the same reference numerals denote the same elements in FIG. 1, and thus the detailed descriptions of the same elements will be omitted.

In the present exemplary embodiment, a liquid crystal display will be described as a representative display apparatus to which the signal processing device 500 (hereinafter, referred to as a signal processor) is coupled. The liquid crystal display employs a vertical alignment (VA) mode VA of liquid crystal molecules in order to improve a side visibility thereof. According to the vertical alignment mode, the liquid crystal molecules are vertically aligned when an electric field is not applied to the liquid crystal molecules and vertically aligned to a direction of the electric field when the electric field is applied to the liquid crystal molecules. In case of a super-patterned vertical alignment (S-PVA) mode of the vertical alignment mode, a pixel PX is divided into two sub pixels PXA and PXB and the liquid crystal molecules corresponding to the sub pixel PXA has a charge ratio different from a charge ratio of the liquid crystal molecules corresponding to the sub pixel PXB. The different charge ratio of the two sub pixels PXA and PXB causes a transmittance difference between the liquid crystal molecules respectively corresponding to the two sub pixels PXA and PXB, so that the side visibility of the liquid crystal display may be improved.

Referring to FIG. 6, a liquid crystal display 1000 includes the signal processor 500 as shown in FIG. 1 and a panel module 900.

The signal processor 500 receives the input image data IDATA and the input control signal ICS from the graphic controller 100 (see, FIG. 1). The input control signal ICS includes a horizontal synchronizing signal Hsync, a vertical synchronizing signal Vsync, a clock signal MCLK, and a data enable signal DE. The signal processor 500 corrects the color characteristic of the input image data IDATA and outputs the corrected input image data IDATA as the output image data ODATA. The output image data ODATA includes a first data signal DATA_A and a second data signal DATA_B. In FIG. 4, one bit expander 240 and one color corrector 250 are shown, but the data processor 230 shown in FIG. 3 may include two bit expanders and two color correctors in order to generate the first data signal DATA_A and the second data signal DATA_B. Also, the signal processor 500 converts the input control signal ICS into the output control signal OCS to control the timing of the output image data ODATA. The output control signal OCS includes a first control signal CNT1 and a second control signal CNT2.

The panel module 900 includes a liquid crystal panel 600, a data driver 700, and a gate driver 800. The liquid crystal panel 600 includes a plurality of data lines D1A~DmB, a plurality of gate lines G1~Gn, a plurality of pixels PX defined by the data lines D1A~DmB and the gate lines G1~Gn.

Each of the pixels PX includes a first sub pixel PXA and a second sub pixel PXB. The first and second sub pixels PXA and PXB are connected to corresponding data lines of the data lines D1A~DmB, respectively, and are commonly connected to a corresponding gate line of the gate lines G1~Gn. The data lines D1A~DmB are extended along a column direction and sequentially arranged along a row direction, and the gate lines G1~Gn are extended along the row direction and sequentially arranged along the column direction.

The data driver 700 converts the first and second data signals DATA_A and DATA_B in a digital form into the first and second data signal DATA_A and DATA_B in an analog form in response to the first control signal CNT1. The first and second data signal DATA_A and DATA_B that are converted into the analog form are applied to the pixels PX through the data lines D1A~DmB as data voltages.

The gate driver 800 outputs gate signals to the gate lines G1~Gn of the liquid crystal panel 100 in response to the second control signal CNT2 from the signal processor 500. The gate signals are applied to the pixels PX through the gate lines G1~Gn as gate voltages. Thin film transistors respectively arranged in the pixels PX are turned on or off by the gate voltages.

Referring to FIG. 7, each pixel includes the first sub pixel PXA and the second sub pixel PXB. When a first pixel is illustrated as a representative pixel, the first sub pixel PXA is electrically connected to the first data line D1A and the first gate line G1 and includes a first thin film transistor TA, a first storage capacitor CSTA, and a first liquid crystal capacitor CLCA. The second sub pixel PXB is electrically connected to the second data line D1B and the first gate line G1 and includes a second thin film transistor TB, a second storage capacitor CSTB, and a second liquid crystal capacitor CLCB.

The first and second data lines D1A and D1B are electrically connected to the data driver 300, and the first and second sub pixels PXA and PXB receive the data voltages having different voltage level through the first and second data lines D1A and D1B, respectively. The first gate line G1 is electrically connected to the gate driver 400, and the gate voltage transmitted through the first gate line G1 substantially and simultaneously turns on or off the first and second thin film transistors TA and TB of the first and second sub pixels PXA and PXB. As the above-described, each pixel receives a corresponding data voltage according to turn-on or turn-off of a corresponding thin film transistor TA or TB and displays an image corresponding to the received data voltage.

In FIGS. 6 and 7, the liquid crystal display has been illustrated as a representative display apparatus according to the present invention; however, the above-described signal processing device and the signal processing method may be applied to various display apparatuses, such as a plasma display panel device (PDP), an organic light emitting display (OLED), etc.

According to the above, the number of color correction data in the low gray-scale range increases, and the number of color correction data in the high gray-scale range decreases by the increase of the number of color correction data in the low gray-scale range. Thus, the color characteristic of the low gray-scale range may be improved without variation of the number of color correction data.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A signal processing device comprising:

a memory storing a first color correction data a second color correction data having a fewer number of bits than the first color correction data;

a bit expander receiving the second color correction data and expanding the second color correction data to a third color correction data having a number of bits equal to the number of bits of the first color correction data using a linear interpolation; and a color corrector receiving an input image data, correcting the input image data corresponding to a first gray-scale range with reference to the first color correction data, and correcting the input image data corresponding to a second gray-scale range with reference to the third color correction data to generate an output image data, wherein the second gray-scale range is higher than the first gray-scale range, wherein the second color correction data comprises a color correction data having M-bits and a color correction data having L-bits (L is a natural number smaller than M) and, wherein the second gray-scale range comprises an intermediate gray-scale range and a high gray-scale range having a gray-scale level higher than a gray-scale level of the intermediate gray-scale range, the M-bit color correction data serves as a color correction data of the input image data corresponding to the intermediate gray-scale range, and the L-bit color correction data serves as a color correction data of the input image data corresponding to the high gray-scale range.

2. The signal processing device of claim 1, wherein the third color correction data comprises a first subset obtained by expanding the M-bit color correction data to the N-bit and a second subset obtained by expanding the L-bit color correction data to the N-bit.

3. The signal processing device of claim 1, wherein the bit expander comprises:

a first linear interpolator receiving the M-bit color correction data from the memory and expanding the M-bit color correction data by (N-M)-bit using linear interpolation to generate a first subset of the third color correction data; and a second linear interpolator receiving the L-bit color correction data from the memory and expanding the L-bit color correction data by (N-L)-bit using the linear interpolation to generate a second subset of the third color correction data.

4. The signal processing device of claim 3, wherein the color corrector comprises:

a lookup table storing the first color correction data, the first subset of the third color correction data, and the second subset of the third color correction data and converting the input image data corresponding to the first and second gray-scale ranges to the corrected input image data with reference to the first color correction data and the first and second subsets of the third color correction data; and a dithering processor dithering the corrected input image data to generate the output image data.

5. The signal processing device of claim 1, wherein the memory comprises an electrically erasable and programmable read only memory (EEPROM).

6. The signal processing device of claim 1, wherein the first color correction data has the same number of bits as the input image data.

7. The signal processing device of claim 6, wherein the number of bits of the first color correction data is N-bits (N is a natural number greater than M).

8. The signal processing device of claim 7, wherein the first color correction data, the M-bit color correction data, and the L-bit color correction data have different gray-scale intervals.

9. The signal processing device of claim 8, wherein the gray-scale interval of the first color correction data is smaller than the gray-scale interval of the L-bit color correction data.

10. The signal processing device of claim 9, wherein N is 10, M is 8, and L is 6.

11. A method of correcting data, comprising:

storing a first color correction data and a second color correction data having a fewer number of bits than the first correction data;

expanding the second color correction data to a third color correction data having a number of bits equal to the number of bits of the first color correction data using linear interpolation; and correcting an input image data corresponding to a first gray-scale range with reference to the first color correction data, and correcting the input image data corresponding to a second gray-scale range with reference to the third color correction data to generate an output image data, wherein the second gray-scale range is higher than the first gray-scale range, wherein the second color correction data comprises a color correction data having M-bits and a color correction data having L-bits (L is a natural number smaller than M) and, wherein the second gray-scale range comprises an intermediate gray-scale range and a high gray-scale range having a gray-scale level higher than a gray-scale level of the intermediate gray-scale range, the M-bit color correction data serves as a color correction data of the input image data corresponding to the intermediate gray-scale range, and the L-bit color correction data serves as a color correction data of the input image data corresponding to the high gray-scale range.

12. The method of claim 11, wherein the first color correction data, the M-bit color correction data, and the L-bit color correction data have different gray-scale intervals.

13. The method of claim 12, wherein the gray-scale interval of the first color correction data is smaller than the gray-scale interval of the L-bit color correction data.

14. The method of claim 11, wherein the first color correction data has the same number of bits as the input image data.

15. The method of claim 14, wherein the first color correction data has N-bits (N is a natural number greater than M).

16. A display apparatus comprising:

a signal processor correcting a color characteristic of an input image data with reference to a first color correction data and a third color correction data and outputting the corrected input image data as an output image data; and a display panel displaying an image in response to the output image data, wherein the signal processor comprises:

a memory storing the first color correction data and a second color correction data having a fewer number of bits than the first color correction data;

a bit expander receiving the second color correction data and expanding the second color correction data to the third color correction data having a number of bits equal to the number of bits of the first color correction data using a linear interpolation; and a color corrector receiving an input image data, correcting the input image data corresponding to a first gray-scale range with reference to the first color correction data, and correcting the input image data corresponding to a second gray-scale range with reference to the third color correction data to generate the output image data, wherein the second gray-scale range is higher than the first gray-scale range, wherein the second color correction data comprises a color correction data having M-bits and a color correction data having L-bits (L is a natural number smaller than M) and, wherein the second gray-scale range comprises an intermediate gray-scale range and a high gray-scale range having a gray-scale level higher than a gray-scale level of the intermediate gray-scale range, the M-bit color correction data serves as a color correction data of the input image data corresponding to the intermediate gray-scale range, and the L-bit color correction data serves as a color correction data of the input image data corresponding to the high gray-scale range.

17. The display apparatus of claim 16, wherein the first color correction data has the same number of bits as the input image data.

* * * * *